(12) United States Patent
Radice

(10) Patent No.: US 10,981,408 B2
(45) Date of Patent: Apr. 20, 2021

(54) SAFETY DEVICE, METHOD AND SYSTEM FOR AUTHORIZING AN OPERATION

(71) Applicant: DG GROUP S.P.A., Novara (IT)

(72) Inventor: Dino Radice, Milan (IT)

(73) Assignee: DG GROUP S.P.A., Novara (IT)

(*) Notice: Subject to any disclaimer, the term of this patent is extended or adjusted under 35 U.S.C. 154(b) by 0 days.

(21) Appl. No.: 16/790,032

(22) Filed: Feb. 13, 2020

(65) Prior Publication Data

US 2020/0269626 A1    Aug. 27, 2020

(30) Foreign Application Priority Data

Feb. 27, 2019    (IT) .................. 102019000002873

(51) Int. Cl.

| | |
|---|---|
| *B42D 25/29* | (2014.01) |
| *B42D 25/355* | (2014.01) |
| *B32B 37/04* | (2006.01) |
| *G07D 7/00* | (2016.01) |
| *G07D 7/12* | (2016.01) |
| *B42D 25/328* | (2014.01) |
| *B42D 25/455* | (2014.01) |

(52) U.S. Cl.
CPC .............. *B42D 25/29* (2014.10); *B32B 37/04* (2013.01); *B42D 25/355* (2014.10); *G07D 7/00* (2013.01); *G07D 7/003* (2017.05); *G07D 7/12* (2013.01); *B32B 2425/00* (2013.01); *B42D 25/328* (2014.10); *B42D 25/455* (2014.10)

(58) Field of Classification Search
CPC ...... B42D 25/29; B42D 25/355; G07D 7/003; G07D 7/00; G07D 7/12; B32B 37/04
USPC .......................................................... 382/135
See application file for complete search history.

(56) References Cited

U.S. PATENT DOCUMENTS

| | | | | |
|---|---|---|---|---|
| 7,040,663 | B1* | 5/2006 | Plaschka ................. | B41M 3/148 283/72 |
| 7,729,026 | B2* | 6/2010 | Argoitia ............... | B42D 25/328 359/2 |
| 2007/0241553 | A1* | 10/2007 | Heim ................... | B42D 25/351 283/91 |
| 2011/0095518 | A1* | 4/2011 | Hoffmuller .......... | G03H 1/0252 283/85 |
| 2015/0258837 | A1* | 9/2015 | Ritter ................... | B42D 25/351 283/67 |
| 2015/0314629 | A1* | 11/2015 | Ritter .................... | B42D 25/40 283/85 |

(Continued)

*Primary Examiner* — Daniel A Hess
(74) *Attorney, Agent, or Firm* — Mark Malek; Widerman Malek, PL

(57) ABSTRACT

The present invention refers to a safety device (1) for authorizing an operation, comprising:
  a supporting structure (2);
  a color-shift structure (5) coupled to the supporting structure (2) on a side or face of this latter;
  a first safety string (6) made in the supporting structure (2) and disposed on said side or face of the supporting structure (2) so that the first safety string (6) and color-shift structure (5) are overlapped on each other;
  a second safety string (7) made in the supporting structure (2) and disposed on said side or face of the supporting structure (2) so that the second safety string (7) and color-shift structure (5) are overlapped on each other.

The present invention refers also to a safety method and system for authorizing an operation exploiting such safety device.

15 Claims, 2 Drawing Sheets

(56) References Cited

U.S. PATENT DOCUMENTS

2016/0325578 A1* 11/2016 Ritter ................... B42D 25/373
2020/0001638 A1* 1/2020 Godfrey ................ B42D 25/24

* cited by examiner

SAFETY DEVICE, METHOD AND SYSTEM FOR AUTHORIZING AN OPERATION

CROSS REFERENCE TO RELATED APPLICATIONS

This is a utility patent application which claims the benefit of IT 102019000002873, filed on Feb. 27, 2019, the contents of which are hereby incorporated by reference in its entirety.

TECHNICAL FIELD OF THE INVENTION

The present invention refers to a safety device, such as a safety card or badge, and also to a safety method and system for authorizing an operation, for example of an electronic device, such as for activating or deactivating a software application for executing the operation, or for activating or deactivating the electronic device itself, by said safety device.

Prior Art

Nowadays, the requirement of having safety systems enabling only abilitated users to authorize some types of operations, for example the activation or deactivation of an electronic device is deeply felt. For example, modern smartphones provide plural safety levels for authorizing operations, such as: unlocking the smartphone, authorizing payments, and access to applications which, in turn, provide operations (for example the applications provided by banks, by which it is possible to perform bank operations, such as transfers, or online payments by credit cards).

These operations are authorized by a user, for example by inserting a password (for example a telephone unlocking code and/or a further fixed or changing password), or by acknowledging biometric parameters by dedicated sensors (for example: fingerprints or face recognition).

All the above described safety systems are of a software type. For example, a phone stores a password, fingerprint or parameters for the face recognition and, for authorizing the operation, compares the stored information with an input provided by the user. Consequently, the operation is authorized only if the input matches the stored information. Therefore, despite the high safety levels obtained for protecting the stored information, it is still possible that a skilled hacker could fraudulently steal this information and consequently could authorize operations which should be only available to the authorized user.

BRIEF SUMMARY OF THE INVENTION

Therefore, an object of the present invention consists of providing a safety device overcoming the cited problems of the prior art, wherein particularly the authorization of an operation does not depend only on a software-type safety.

This and other objects are met by a safety device according to claim 1, a safety method according to claim 11 and a safety system according to claim 14.

The dependent claims define possible advantageous embodiments of the invention.

BRIEF DESCRIPTION OF THE DRAWINGS

In order to gain a better comprehension of the invention and appreciate the advantages thereof, some exemplifying non-limiting embodiments will be described in the following with reference to the attached drawings, wherein.

DETAILED DESCRIPTION OF THE INVENTION

Figure 1:
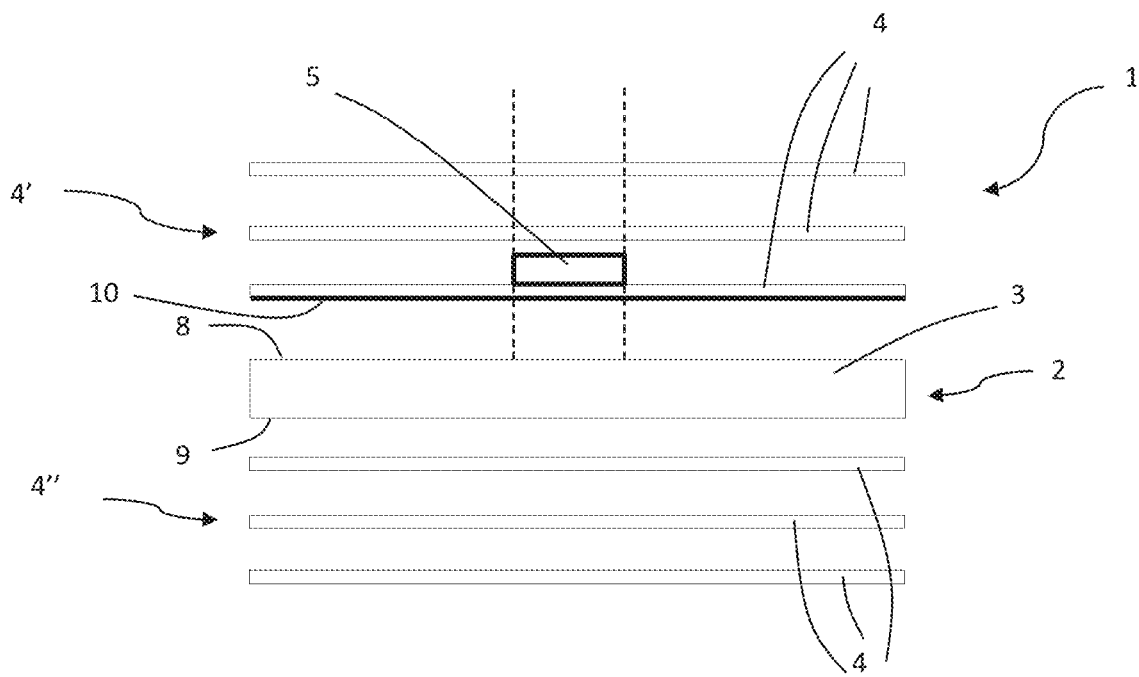
FIG. 1 is an exploded schematic cross-section view of a safety device according to a possible embodiment of the invention.

With reference to the attached FIGS. 1 and 2, 1 generally represents a safety device. The safety device 1 can be made, for example, in a card shape, of a type for example used for making documents (such as a driving license or an identity card), credit or debit cards, safety cards provided by banks, passports or similar.

The safety device 1 comprises a supporting structure 2 being generally and preferably thin, in other words is substantially two-dimensional (i.e. the thickness is much smaller than the length or width). According to a possible embodiment, the supporting structure 2 can be in the shape of a card made of (particularly multilayered) polycarbonate or of PVC, or Teslin, or polyester, or similar.

Advantageously, the supporting structure 2 comprises a supporting layer 3 and one or more further additional layers 4, overlapped on each other, preferably having a thickness less than the one of the supporting layers 3. According to a possible embodiment, the supporting layer 3 is arranged between a first group of additional layers 4' (developing from an upper face 8 of the supporting layer 3) and a second group of additional layers 4" (developing from a lower face 9 of the supporting layer 2). Referring for example to the above-cited polycarbonate cards, the supporting layer 3 and additional layers 4 are preferably made of polycarbonate. According to an embodiment, the supporting layer 3 has a thickness comprised between 200 and 500 microns, while each of the additional layers 4 has a thickness comprised between 50 and 150 microns. The supporting layer 3 and additional layers 4 can be bonded to each other for example by laminating or heat pressing them, in order to form an integral multilayered body.

Referring for example to documents, features and generic texts (for example the data of a company issuing the card) are preferably printed on the supporting layer 3, while the individual data (for example personal information of the owner: name, family name, date of birth, possible barcodes, other numeric strings, etcetera) are preferably applied, in other words activated/made visible, for example by using a laser, on one of the auxiliary layers 4', preferably on the lower side thereof 10, in other words on the side thereof facing the supporting layer 3.

The safety device 1 comprises a color-shift structure 5 coupled to the supporting structure 2. In the present description and in the attached claims, the term "color-shift structure" means a structure capable of shifting color as the interaction with the light emitted by a light source changes without using colored pigments, particularly as the angle of incidence of a light ray on the color-shift structure 5 itself varies.

Different types of color-shift structures 5 are known.

According to a first type, the color-shift structures are obtained by photonic crystals. In optics and microphotonics, the term photonic crystal means a structure whose refraction index has a periodic modulation at a level comparable with the wavelength of the light or, more generally, with an electromagnetic radiation. Based on the type of periodic modulation of the refraction index, the photonic crystals can be classified in:

one-dimensional photonic crystals, having a periodicity of the refraction index in only one direction (also known as Bragg mirrors);

two-dimensional photonic crystals, having a periodicity of the refraction index in two directions;

three-dimensional photonic crystals, having a periodicity of the refraction index in three directions.

According to a second type, the color-shift structures are obtained by plasmonic colors. The plasmonic colors, also known as structural colors, are obtained by a resonance interaction between the light and metal periodic nanostructures. Localized surface plasmons, generated by these structures, enable, by nanometrically controlling the morphology, to generate colors without using pigments.

According to a third type, the color-shift structures are obtained by liquid crystals. Such structures are characterized by the fact that they do not directly change from the liquid state to the solid state, but are characterized by organizing themselves, under particular conditions, in intermediate phases, called mesophases. Such structures are capable of modulating the light since they have the birefringence property. In other words, they have two different refraction indexes as a function of the liquid or crystal configuration thereof.

Figure 3:
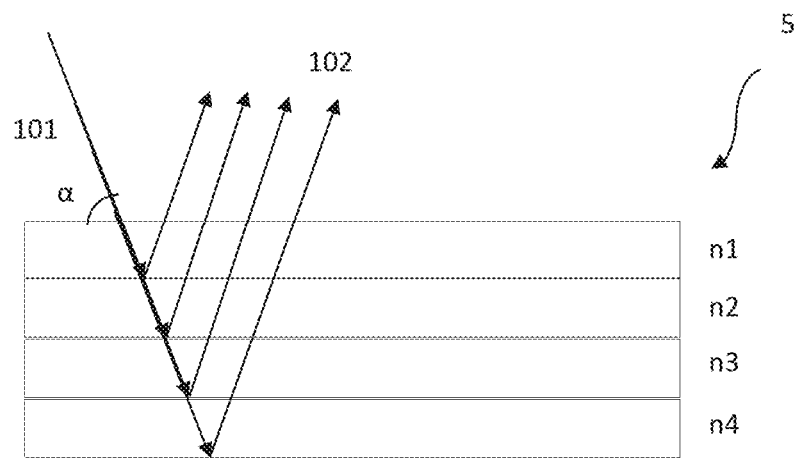
FIG. 3 is a schematic cross-section view of a color-shift with a one-dimensional photonic crystals structure.

According to an embodiment, the color-shift structure 5 of the safety device 1 comprises a one-dimensional photonic crystals structure. With reference to FIG. 3, the one-dimensional photonic crystals structure comprises a plurality of layers having corresponding refraction indexes n1, n2, n3, n4. Given a light ray 101 incident with an incidence angle α, the reflected overall light is given by a beam 102 of reflected light rays. Suitably selecting the periodicity and the refraction indexes of the layers makes possible to manufacture mirrors having a very high reflectivity in a determined wavelength range. Consequently, changing the angle of incidence a of the incident light ray 101 enables a viewer, assumed stationary with respect to the color-shift structure and light source, to see a color variation of the structure. Analogously, the viewer will see color variations in the color-shift structure if, for the same angle of incidence of the incident light ray, if he/she changes his/her position and/or orientation with respect to the color-shift structure and consequently with respect to the reflected light beam 102.

Referring again to the arrangement illustrated in FIG. 1, the color-shift structure 5 can be placed on one of the additional layers 4, preferably on one of the additional layers 4' placed on the upper face 8 of the supporting layer 2. Still more preferably, the color-shift structure 5 is placed so that the auxiliary layer 4' on which the individual data are applied, is arranged below the color-shift structure 5, in other words is arranged between the color-shift structure 5 and supporting layer 4.

According to a possible embodiment, it is observed that the color-shift structure 5 can be embedded in a more sophisticated safety element (not shown in the figures), such as a hologram or a diffractive grating. The safety device 1 can also comprise one or more of such safety elements, such as holograms or diffractive gratings, devoid of the color-shift structure. The safety elements, with or without color-shift structure 5, can be embossed on single additional layers 4 or can be heat or cold transferred on them.

Figures 2A, 2B:
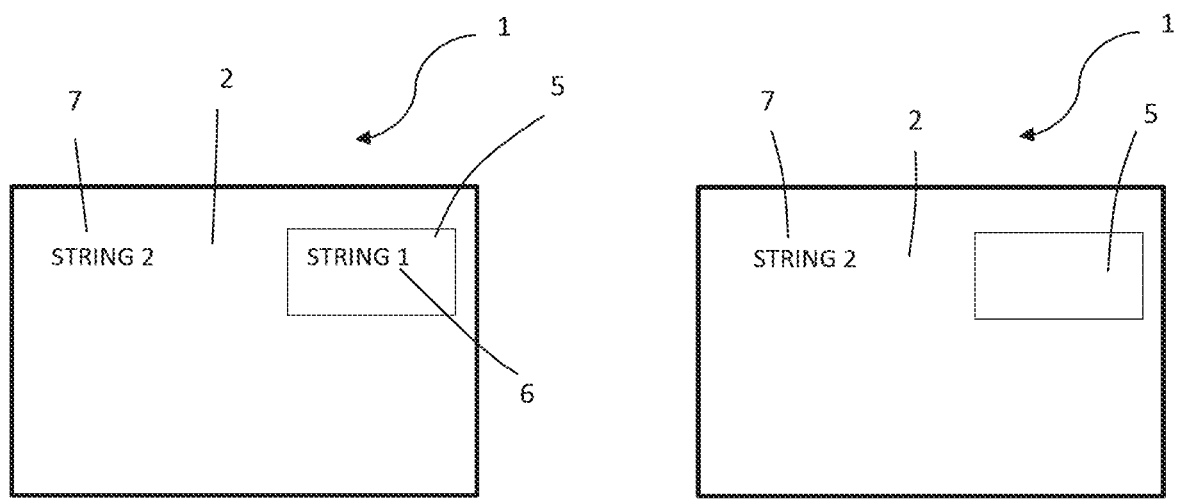
FIGS. 2a and 2b are front views of a safety device according to an embodiment of the invention in two different conditions of use.

Referring now to FIGS. 2a and 2b, the safety device 1 comprises a first safety string 6 made in the supporting structure 2 and arranged on the same side, particularly on the same face, of the safety device 1 on which the color-shift structure 5 is placed (preferably on the upper face corresponding to the upper face 8 of the supporting structure 2), so that the first safety string 6 and color-shift structure 5 are overlapped on each other. Overlapping the color-shift structure 5 and first safety string 6 means that for a viewer observing the face of the safety device 1 where both the color-shift structure 5 and first safety string 6 are arranged, the first safety string 6 is arranged inside an area defined by the color-shift structure 5. Referring to FIG. 1, such area is indicated by broken lines. Referring back to FIG. 2a, the first safety string 6 ("STRING 1") can be seen inside the area, in the example is rectangular and defined by the color-shift structure 5. As it will be explained in the following, at specific angles of incidence of the light on the color-shift structure 5, the first safety string is not visible (FIG. 2b).

The first safety string 6 can for example include an alphanumeric string, an image, a symbol, a barcode, a QR code or similar.

The first safety string 6 can be made on the supporting layer 3 or in one of the additional layers 4 placed above or below the color-shift structure 5 (in other words, respectively in the additional layers 4 facing the outside of the safety device 1 or in the additional layer 5 arranged between the color-shift structure 5 and supporting layer 3). The first safety string 6 can be made on one of said layers by different techniques, for example by laser. Referring again to FIG. 1, the color-shift structure 5 can be applied to the upper face 8 of the supporting layer 3 or to anyone of the additional layer 4', inside the area defined by the beforehand broken lines. According to a further variant, the first safety string 6 can be placed inside the color-shift structure 5 itself. For example, the one-dimensional photonic crystals color-shift structure 5 can embed in its interferential space a microstructure containing the first safety string 6. This microstructure, according to a possible variant of the invention, can be made with plasmonic colors at least partially deactivated by selectively destroying the material incapsulating the metal nanostructures which, approaching to each other, lose the plasmonic color consequently generating a customized writing.

Referring again to FIGS. 2a and 2b, the safety device 1 comprises a second safety string 7, made in the supporting structure 2 and placed on the same side, particularly on the same face of the safety device 1 wherein the color-shift structure 5 is arranged, so that the second safety string 7 is not overlapped on the color-shift structure 5 and first safety string 6. As hereinbefore described, according to a viewer observing, in a stationary position, the face of the safety device 1 wherein both the color-shift structure 5 and second safety string 7 (for example the upper face of the safety device, corresponding to the upper face 8 of the supporting layer 3) are arranged, the second safety string 7 is disposed outside the area defined by the color-shift structure 5, in other words outside the area defined by the broken lines of FIG. 1. Referring to FIGS. 2a and 2b, the second safety string 7 ("STRING 2") is always visible from the outside of the area defined by the color-shift structure 5.

The second safety string 7 can for example include an alphanumeric string, an image, a symbol, a barcode, a QR code, or similar.

It is observed that the first 6 and second strings 7 can be independent strings, or, as an alternative, portions of a same complex safety string, wherein a portion (the first safety string 6) overlaps the color-shift structure 5 and a portion (the second safety string) is not overlapped on the color-shift structure 5.

The second safety string 7 can be applied to the supporting layer 3 or to one of the additional layers 4 placed above or below the color-shift structure 5. The second safety string 7 can be applied to one of said layers by different techniques, for example by a laser.

Figure 4A:
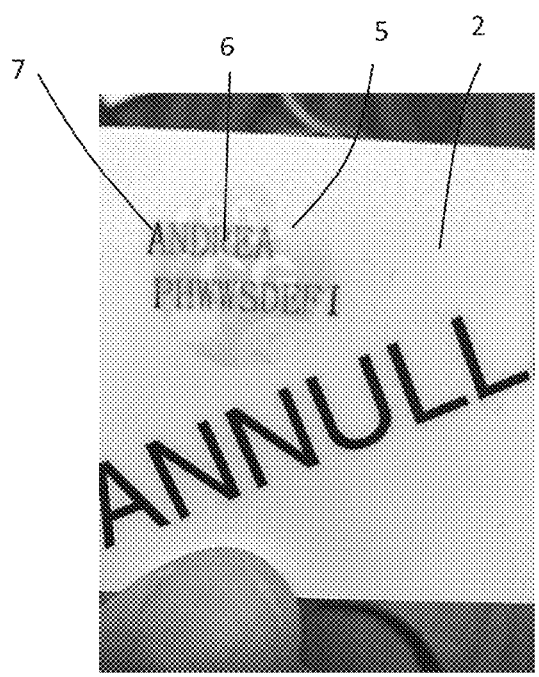
FIGS. 4a-4b are photographic images of a safety device according to an embodiment of the invention in different conditions of use.
Figure 4B:
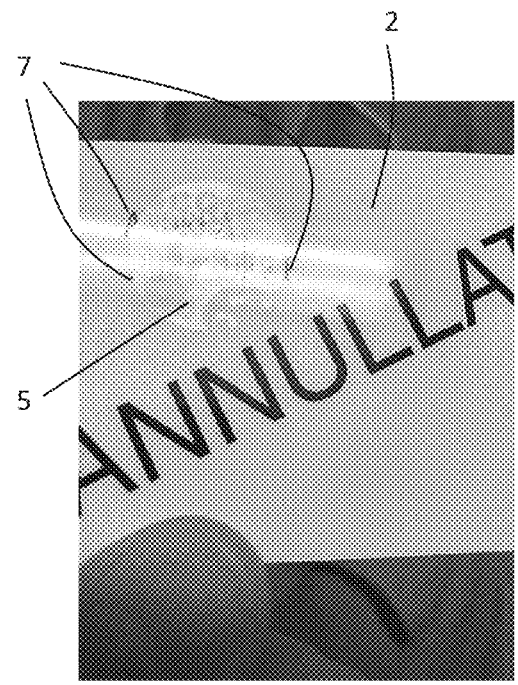

The photos shown in FIGS. 4a-4b enable to appreciate what the Applicant discovered: varying the angle of incidence of a light ray incident on the face of the safety device 1 comprising the color-shift structure 5, the first safety string 6 and second safety string 7, a stationary viewer observes that:

the second safety string 7, being outside the color-shift structure 5, is always visible;

the color-shift structure 5 changes color;

the first safety string becomes invisible or substantially invisible to a viewer at a determined angle of incidence of the incident light (FIG. 4b), on the contrary it remains visible at different angles of incidence (FIG. 4a).

Specifically, the photo of FIG. 4a shows, on a face of a safety card according to the invention, a string consisting of ANDREA PHWWSDEFI, wherein the first letter A of ANDREA, part of the letter P and the letter I of PHWWSDEFI are outside and are not overlapped on the color-shift structure 5 (therefore they form the second safety string 7), while the remaining part of the string ANDREA PHWWSDEFI is inside and is overlapped on the color-shift structure 5 (consequently forms the first safety string 6). Modifying the angle of incidence of the light, causes the color-shift structure 5 to change color and part of the string ANDREA PHWWSDEFI overlapping on the color-shift structure 5 to substantially disappear, while the first letter A of ANDREA, part of the letter P and letter I of PHWWSDEFI, outside the color-shift structure 5, remain visible (FIG. 4b).

Such purely optical phenomenon can be advantageously used in a safety method of authorizing an operation based on a double reading, performed by a suitable optical reader capable of acknowledging the first 6 and second safety strings 7 (for example the camera of a cellphone or smartphone, or an optical reader dedicated to the type of characters included in the first 6 and second safety strings 7), wherein in the first reading both the first 6 and second safety strings 7 are visible, and in the second reading, performed by suitably varying the angle of incidence of the light ray incident on the face of the safety device 1 on which the color-shift structure 5 is placed, only the second safety string 7 is visible (and detectable by the optical reader). The operation is authorized only if:

1) in the first reading, performed at a first predefined angle of the incident light ray, both the safety strings 6 and 7 are visible and acknowledged;
2) in the second reading, performed at a second predefined angle of incidence of the incidence light ray, only the second safety string 7 is visible and can be acknowledged, while the first safety string is invisible. If, in the second reading, also the second safety string 6 is visible, the operation is not authorized.

As an alternative, it is noted that it is possible in the two readings to maintain fixed the angle of incidence of the light ray and modify the position of the optical reader with respect to the safety device. Therefore, more generally, it is necessary to perform the first and second readings respectively with first and second relative predefined orientations and positions between the safety device, the light source and the optical reader.

Moreover, it is observed that the first and second readings should not necessarily be performed with the shown order.

Consequently, due to the use of the safety device, a double safety level is obtained:

1) a software-type safety based on the acknowledgement of the safety strings, which both must be authentic (obviously, if one or both the safety strings do not correspond to the stored ones, the operation is not authorized);
2) a hardware-type safety based on the need of performing, with predefined criteria and most of all with predefined angles of incidence, a double reading of the strings 6 and 7 of the safety device 1, made with safety elements which are very difficult to be reproduced, wherein in the second reading the first safety string 6 must be invisible due to the optical interference between the color-shift structure 5 and first safety string 6.

Therefore, a skilled hacker, even though were capable of entering for example the memory of a smartphone and steal the first and second safety strings, he/she would not be capable of authorizing the operation, because it requires the above cited double reading of the physical safety device 1, which is too complicated to be reproduced.

According to a possible embodiment, the method can be made safer by correlating the readings to the color variations of the first safety string 6 detectable by the optical reader due to color variations of the color-shift structure. For example, in order to authorize the operation in the first reading, the method can require the first safety string to be not only visible and acknowledged but also detected by a predefined color. According to further variants, a third and possible further readings could be detected for third and further predefined relative orientations and positions of the safety device, optical reader, and light source, so that the operation is authorized only if, for each of these further readings, the first and second safety strings are visible and acknowledged, and the first safety string 6 has further predefined colors corresponding to those specific relative orientations and positions.

The safety device and method according to the invention can find an application in many fields. For example, they can be used for unlocking a cellphone or smartphone or another electronic device (such as a PC or tablet) or, more generally, for authorizing operations by the same (for example, bank transactions performed by applications installed on the same), executable only if the electronic device performs the described safety method by reading the safety string for example written on a suitable safety card. This authorization can be provided as an alternative or in addition to the authorization performed by known modes (password and/or detecting biometric parameters, such as fingerprints or face recognition).

A safety system, in addition to the light source (for example, the flash of the cellphone or smartphone or other electronic device), to the optical reader (for example the camera of the cellphone or smartphone or other electronic device), and to the safety device (for example the safety card), can include an auxiliary apparatus for automatically performing the safety method. For example, such apparatus can be configured to receive the safety card and the cellphone or other electronic device and for orienting and positioning them with respect to each other so that the incident light has a sequence of predefined angles. The apparatus can be connected to the cellphone or smartphone or other electronic device so that this latter reads the safety strings when it takes the predefined relative orientations and positions. The safety strings can be beforehand generated or can be generated by the cellphone or smartphone or the electronic device itself.

The safety device according to the invention can be embedded in a safety card, or in a document (such as for example an identity card or a driving license) or in a credit or debit card, or similar.

A person skilled in the art in order to meet contingent specific requirements can introduce many additions, modifications, or substitutions of elements with other functionally equivalent ones to the above given description without falling out of the field of the attached claims.

The invention claimed is:

1. A safety method for authorizing an operation, comprising:
providing a safety device comprising a supporting structure, a color-shift structure coupled to the supporting structure on a side or a face of this latter, a first safety string made in the supporting structure and arranged on said side or face of the supporting structure so that the first safety string and color-shift structure are overlapped on each other, a second safety string made in the supporting structure and arranged on said side or face of the supporting structure so that the second safety string and the color-shift structure are not overlapped on each other, a light source and an optical reader capable of acknowledging the first and second safety strings of the safety device;
lighting, by the light source, the color-shift structure of the safety device and performing, by the optical reader, a first reading of the first and second safety strings by holding a predefined relative first position and first orientation among the safety device, the light source, and optical reader;
lighting, by the light source, the color-shift structure of the safety device and performing, by the optical reader, a second reading of the first and second safety strings by holding a predefined relative second position and second orientation among the safety device, the light source, and optical reader;
authorizing the operation if:
in the first reading, both the first and second safety strings are visible and acknowledged by the optical reader; and
in the second reading, only the second safety string is visible and acknowledged by the optical reader, and the first safety string is invisible to the optical reader.

2. The safety method according to claim 1, wherein the operation is authorized if in the first reading the first safety string is visible and acknowledged by the reader and further has a first predefined color.

3. The safety method according to claim 1, wherein the operation comprises: unlocking a cell phone, a smartphone, or another electronic device, performing an operation by the same or by an application installed in the same.

4. The safety method according to claim 1, wherein the color-shift structure comprises a one-dimensional photonic crystals structure.

5. The safety method according to claim 1, wherein the supporting structure comprises a supporting layer and one or more further additional layers overlapped on the supporting layer on one or both the sides of this latter.

6. The safety method according to claim 5, wherein the color-shift structure is arranged on one of said one or more additional layers.

7. The safety method according to claim 5, wherein the first safety string is made on the supporting layer, or in one of the one or more additional layers, or inside the color-shift structure.

8. The safety method according to claim 5, wherein the second safety string is made on the supporting layer or in one of the one or more additional layers.

9. The safety method according to claim 1, wherein the first and second safety strings include an alphanumeric string, an image, a symbol, a barcode, a QR code, or similar.

10. The safety method according to claim 1, wherein the first and second safety strings are distinct safety strings or are two portions of a same safety string.

11. The safety method according to claim 1, wherein said supporting structure is shaped as a card having an upper face and a lower face, said side or face of the safety device corresponding to said upper face or lower face of the card.

12. The safety method according to claim 1, wherein the safety device R embedded in a safety card, or in a document, or in a credit or debit card.

13. A safety system for authorizing an operation of an electronic device, comprising:
a safety device comprising a supporting structure, a color-shift structure coupled to the supporting structure on a side or a face of this latter, a first safety string made in the supporting structure and arranged on said side or face of the supporting structure so that the first safety string and color-shift structure are overlapped on each other, a second safety string made in the supporting structure and arranged on said side or face of the supporting structure so that the second safety string and the color-shift structure are not overlapped on each other;
a light source;
an optical reader capable of acknowledging the first and second safety strings of the safety device;
said electronic device comprising:
a control unit configured to perform a method including the steps of:
lighting, by the light source, the color-shift structure of the safety device and performing, by the optical reader, a first reading of the first and second safety strings by holding a predefined relative first position and first orientation among the safety device, the light source, and optical reader;
lighting, by the light source, the color-shift structure of the safety device and performing, by the optical reader, a second reading of the first and second safety strings by holding a predefined relative second position and second orientation among the safety device, the light source, and optical reader;
authorizing the operation if:
in the first reading, both the first and second safety strings are visible and acknowledged by the optical reader; and
in the second reading, only the second safety string is visible and acknowledged by the optical reader, and the first safety string is invisible to the optical reader.

14. The safety system according to claim 13, wherein said electronic device comprises a cell phone, a smartphone, a tablet, or a computer, said light source and said optical reader being embedded in said electronic device.

15. The safety system according to claim 13, further comprising an auxiliary apparatus operatively connected to the light source, the optical reader, and the electronic device, and configured to move the safety device and/or light source and/or optical reader so that these take said predefined relative orientations and positions, wherein the auxiliary apparatus comprises said control unit.

\* \* \* \* \*